US006106270A

United States Patent [19]

Hardin

[11] Patent Number: 6,106,270

[45] Date of Patent: Aug. 22, 2000

[54] WASTE SOAP COMPRESSOR

[75] Inventor: Jim Hardin, Dubois, Wyo.

[73] Assignee: Dianne T. Matthews, Bloomfield Hills, Mich.; a part interest

[21] Appl. No.: 08/856,413

[22] Filed: May 14, 1997

[51] Int. Cl.[7] .............................................. B29C 43/02

[52] U.S. Cl. ..................................... 425/412; 425/457

[58] Field of Search .............................. 425/419, 412, 425/457, 318, DIG. 46, 521

[56] References Cited

U.S. PATENT DOCUMENTS

| | | | |
|---|---|---|---|
| 2,486,347 | 10/1949 | Walker . | |
| 3,712,516 | 1/1973 | Stamets et al. | 222/326 |
| 4,035,122 | 7/1977 | Cavanaugh . | |
| 4,264,292 | 4/1981 | Pisoni . | |
| 4,344,529 | 8/1982 | Ibarzabal . | |
| 4,411,848 | 10/1983 | De Santis | 425/412 |
| 4,501,354 | 2/1985 | Hoffman . | |
| 4,501,355 | 2/1985 | Hoffman . | |
| 4,655,702 | 4/1987 | Hodgson . | |
| 4,781,564 | 11/1988 | Cerrone . | |
| 4,917,589 | 4/1990 | Manderson . | |
| 5,030,405 | 7/1991 | Smith et al. . | |
| 5,391,069 | 2/1995 | Bendzick | 425/419 |
| 5,472,545 | 12/1995 | Malki . | |
| 5,489,200 | 2/1996 | McGraw et al. | 425/DIG. 46 |

*Primary Examiner*—Jay H. Woo
*Assistant Examiner*—Robert Hopkins
*Attorney, Agent, or Firm*—Young & Basile, PC.

[57] ABSTRACT

A soap compressor has a movable compressor plate mounted within a container. An extension member is coupled to the compression plate and is forcibly moved along with the compression plate by a drive member to forcibly urge the compression plate into a plurality of small bars of soap to compress the small bars of soap into a single large bar of soap. The drive member is a fluid operated cylinder connectable to the pressurized water system of a building by means of a fluid conduit and quick release valves. Alternately, the drive means is an electric motor having an output shaft rotating a gear along a toothed rack connected to the compression plate.

8 Claims, 1 Drawing Sheet

WASTE SOAP COMPRESSOR

BACKGROUND OF THE INVENTION

Field of the Invention

The presents relates, in general, to devices for molding small pieces of waste soap into one large soap bar.

Presses or compacting device for compressing many small bars of soap into a larger bar for reuse of waste soap are known. Such presses or compressors typically utilize a plate which is forcibly urged into a chamber containing small bars of soap. The presses or compactors are manually operated and use mechanical levers, cams, crank handles and threaded screws, etc., to forcibly slide the plate through the chamber.

Even with the mechanical advantage provided by such mechanical devices, such presses or compactors still require manual effort on the part of the user. Such is believed to have hindered the widespread use of waste soap compressors.

Thus, it would be desirable to provide a waste soap compressor which, once activated, automatically applies force to a compressor plate without further user intervention. It would also be desirable to provide a waste soap compressor which is easy to operate.

SUMMARY OF THE INVENTION

The present invention is a soap compressor for compressing many small soap bars into one large bar. The compressor includes a container having a removable top. A compression plate is movably mounted within the container for movement toward the bottom wall to compress the small soap bars into one larger bar a cavity formed in the bottom of the container. An extension member extends through the top and is connected to the compression plate. Means are coupled to the extension member for automatically forcibly driving the extension member into the interior chamber of the container toward the bottom of the container to forcibly compress the plurality of small soap bars into a one large bar of soap.

Optionally, at least one and preferably a plurality of spaced apertures are formed in the top and/or the top ends of the side walls of the container for discharging water from the container as the compression plate is moved through the interior chamber. Means may also be provided for removably attaching the top to the side walls of the container. Latch means may be coupled between the side walls of the container and the top for fixedly holding the top on the container during each compression cycle.

According to one embodiment, the means for forcibly driving the extension member includes a fluid operated cylinder mounted on the top. The fluid cylinder has an internally movable piston and a piston rod coupled to the piston. The piston rod having one end extending outward from the cylinder and coupled to the compression plate to act as the extension member.

Means are provided for attaching the fluid cylinder to a source pressurized fluid. The attaching means preferably comprises a fluid conduit connected at one end to a valve coupled to a source of pressurized fluid and to the fluid cylinder at another end. Preferably a relief valve is coupled between the conduit and the fluid cylinder for relieving the pressure within the fluid cylinder at the completion of each compression cycle.

According to a second embodiment, the extension member is in the form of an elongated rack having a plurality of spaced teeth. One end of the rack is connected to the compression plate. A gear is engageable with the rack teeth and is mounted on a bi-directionally rotatable output shaft of an electric motor. Preferably the electric motor and the output gear are mounted on the top of the container.

The soap compressor of the present invention provides automatic means for forcibly driving a compression plate into a plurality of small bars of soap to compress the small bars of soap into one larger bar without requiring user intervention after the user activates the compressor. Commonly available means may be employed for activating the driving means including the use of pressurized water in a building as well as convenient electric power to drive an electric motor.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Figure 1:
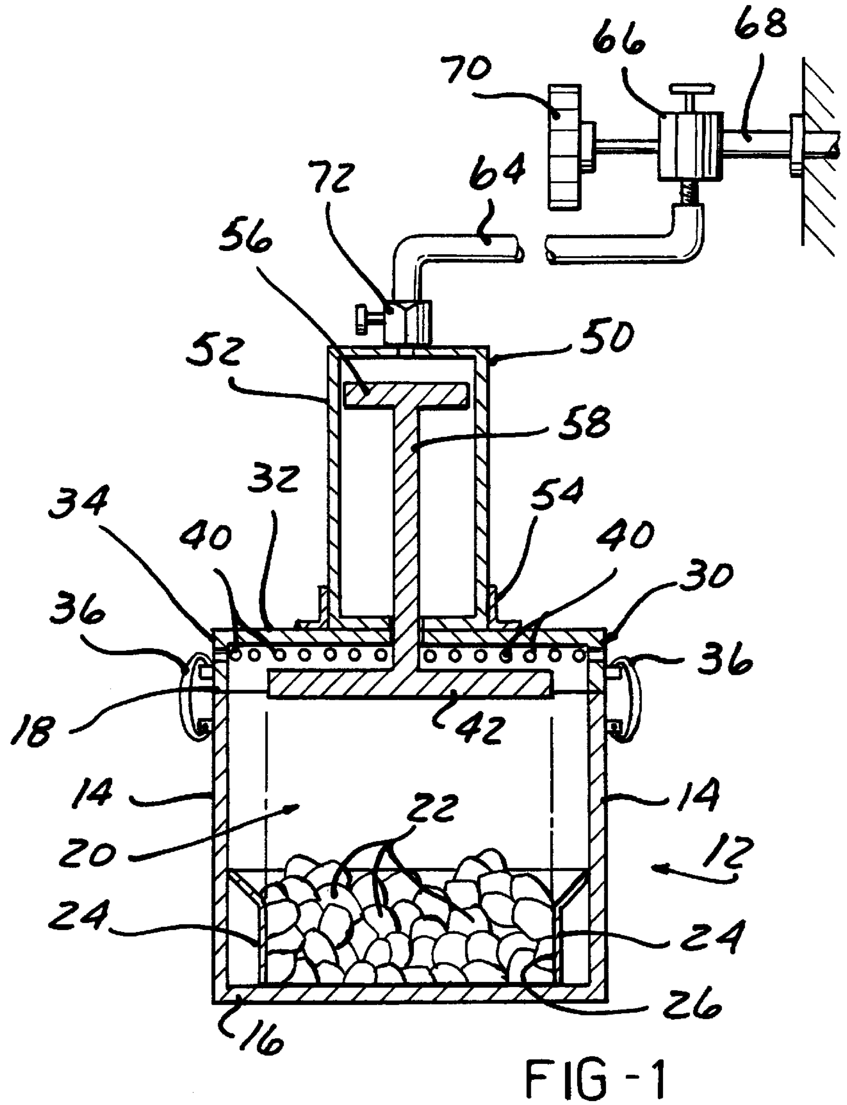
FIG. 1 is a cross-sectioned, side elevational view of a first embodiment of a waste soap compressor according to the present invention.

FIG. 1 depicts a first embodiment of a waste soap compressor 10 according to the present invention. The waste soap compressor 10 includes an enclosure or container 12 formed of four side walls each denoted by reference number 14, which extend from a bottom wall 16 to an open top end 18. The side walls 14 and the bottom wall 16 define an interior hollow chamber 20. The chamber 20 is designed to receive a plurality of small, waste bars of soap shown in phantom and denoted by reference number 22. A suitably formed receptacle denoted by boss 24 is formed on the bottom wall 22 and adjacent portions of the side walls to define an interior cavity 26 in the shape of a large bar of soap. The cavity 26 as shown in FIG. 1, has overall smaller size than the size of the container 12. The cavity 26 may have any suitable shape for forming a large bar of soap, such as square, rectangular, polygonal, oval, etc.

A top 30 is movably mounted with respect to the side walls 14 and is positioned for sealingly closing the open top ends 18. The top 30 has a generally hollow configuration formed by a planar top wall 32 and short depending side walls 34, by example only. FIG. 1 depicts the top 30 as being completely removable from the side walls 14 of the container 12. However, the top 30 can be connected by a hinge to one of the side walls 14 and merely pivotal from a closed position shown in FIG. 1 to an open position allowing access to the interior chamber 20 within the container 12. Latch means 36 are provided on two opposed side walls 14 of the container 12 and side walls 34 of the top 30 for releasibly latching the top 30 in the closed position shown in FIG. 1. Release of the latch means 36 enables the top 30 to be moved relative to the container 12 to enable the formed large bar of soap to be removed and/or to insert a plurality of small waste bars 22.

A plurality of apertures 40 are formed in the side wall 34 of the top 30 adjacent the top wall 32. The apertures 40 could alternately be formed adjacent the top ends 18 of the side walls 14. The apertures 40 allow for the discharge of water from the interior chamber 20 in the container 12 during compression of the small bars of soap 22.

A compressor plate 42 is movably disposed within the top 30 for movement from a first position shown in FIG. 1 in which the compressor plate 42 is generally disposed adjacent the top wall 32 of the top 30 to a second, lower position in which the compressor plate 42 engages and forcibly compresses the small bars of soap 22 into a single large bar of soap in the cavity 26 formed in the bottom of the container 12.

The compressor plate 42, by example only, has a generally planar configuration and a rectangular shape. Of course, the compressor plate 42 may also have other shapes consistent with the shape of the cavity 26 of the bottom wall 16 to form the large bar of soap of any desired shape. It can be seen in FIG. 1 that the compressor plate 42 has overall dimensions slightly less than the interior dimensions of the side walls 14 of the container 12 to permit easy sliding movement of the compressor plate 42 within the interior chamber 20 and into a close fit with the side walls 24 forming the cavity 26 in the bottom of the container 12.

Automatic means denoted by reference number 50 are provided for forcibly driving the compressor plate 42 through the chamber 20 in the container 12 to compress the plurality of small bars of soap 22 into a single large bar of soap. In the first embodiment shown in FIG. 1, the driving means comprises a fluid actuated cylinder 50 having a housing 52 which is mounted by means of a suitable flange or bracket 54 to the top wall 32 of the top 30. As is conventional, the cylinder 52 has an internal piston 56 which is slidable from a first position shown in FIG. 1 to a second position under the application of pressurized fluid into the end of the cylinder 52 on one side of the piston 56. An elongated piston rod 58 is connected to and movable with the piston 56. One end 60 of the piston rod 58 extends exteriorly of the cylinder housing 52 and forms an extension member which is fixedly mounted or coupled to the compressor plate 42.

Means are provided for connecting the fluid cylinder 50 to a source of pressurized fluid. By way of example only, an elongated fluid conduit or hose 64 is connected at a first end, preferably by a quick-connect fitting, to a manual fluid diverter valve 66. In one example, the on/off fluid valve 66 is mounted to the pipe 68 in communication with a conventional shower head 70 in a bath or shower. The pipe 68, as conventional, is connected to a pressurized building or home water supply to provide pressurized water. In normal use, the diverter valve 66 will typically be in an "on" position allowing conventional flow of water through the shower head control valve, not shown, to the shower head 70. When it is desired to divert the pressurized water to the compressor 10, the valve 66 is rotated to a second position wherein the pressurized fluid through the shower head control valve, which must also be turned to an "on" position, is diverted through the valve 66 to the conduit 64. Alternately, and with suitable fittings, the conduit 64 could be connected to a water faucet.

The other end of the conduit 64 is connected through a manually operated relief valve 72 to a fluid inlet of the cylinder housing 52 as shown in FIG. 1. The manual release valve allows the release of pressurized fluid from the cylinder housing 54 enabling a retraction of the piston rod 58 to the first position shown in FIG. 1 after the completion of a soap compression cycle.

In operation, prior to initiation of a compression cycle, the manual relief valve 72 is closed and the piston 56 and piston rod 58 retracted to the first position shown in FIG. 1. The top 30 is latchingly on the container 12 after a plurality of small bars of soap 22 have been deposited in the bottom of the container 12. Water is poured into the container and allowed to sit for several hours to soften the small bars of soap 22. Next, the conduit 64 is connected to the diverter fluid valve 66, typically by a quick release connection and the valve 66 turned to the second position. The shower head control valve is then moved to the "on" position causing pressurized water to flow through the pipe 68, the valve 66, the conduit 64 and to the cylinder 50 wherein the pressurized water causes movement of the piston 56 from the first position to a second position which drives the piston rod 58 and the attached compressor plate 42 from the first position shown in FIG. 1 into forced contact with the bars of soap 22. Full extension of the piston 56 within the cylinder housing 52 will urge the compressor plate 42 into engagement with an upper edge of the side walls 24 forming the cavity 26 in the bottom of the container 12 thereby compressing the plurality of small bars of soap 22 into a single large bar.

During the compression sequence, the advance of the compressor plate 42 through the interior chamber 20 of the housing 12 will cause a portion of the water within the chamber 20 to flow around the outer periphery of the compressor plate 42 and outward from the container 12 through the apertures 40. Since the compressor 10 is connected to shower connections, the compressor 10 may be easily placed within a conventional bath tub or shower thereby allowing easy removal of the water discharged from the container 12.

After the cylinder piston 56 has been fully extended, the manual relief valve 72 is moved to the "off" position to vent the pressurized fluid from the cylinder housing 52 and enable manual retraction of the compressor plate 42, the piston rod 58 and the piston 50 to the first position shown in FIG. 1. The top 30 is then separated or opened with respect to the container 12 and the water remaining within the chamber 20 in the container 12 removed. The compressed large bar of soap can then be removed from the bottom cavity 26.

Figure 2:
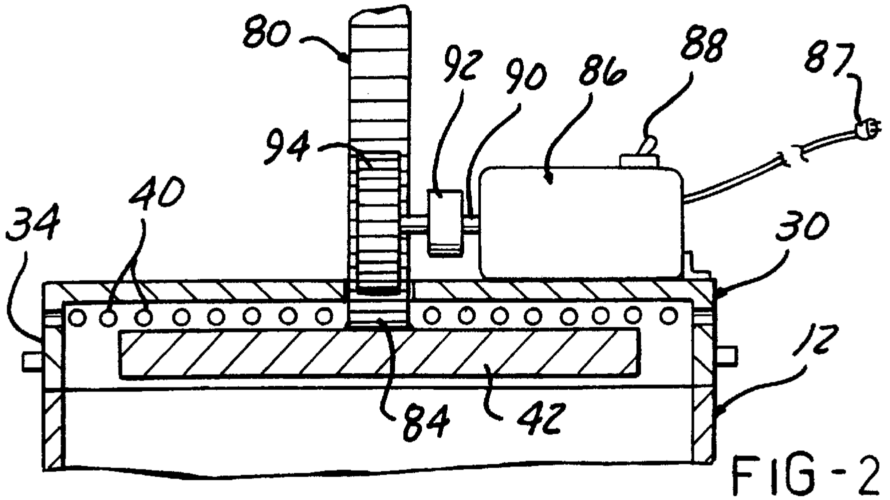
FIG. 2 is cross-sectioned, side elevational view of a second embodiment of a waste soap compressor according to the present invention.

FIG. 2 depicts an alternate embodiment of the driving means which is usable with the same container 12 and top 30 shown in FIG. 1. In this embodiment, the driving means includes an elongated rod 80 having a plurality of longitudinally spaced teeth 82. One end 84 of the rod 80 is connected to the compressor plate 42 and disposed within the top 30.

An electric motor 86 is mounted on the top wall 32 of the top 30 and includes a plug and conductor 87 connectable to a source of electrical power, typically available in a standard electric wall outlet. A three position switch 88 is mounted on the motor 86 or in the conductor 87 to apply electric power to the motor 86 in opposed polarities to cause an output shaft 90 of the motor 86 to rotate in opposite directions. A gear reducer 92 is connected to the output shaft 90 for reducing the speed of rotation of the motor output shaft 90 while providing high output torque on the output shaft 90. An output shaft from the gear reducer 90 has a toothed gear 94 mounted thereon. The gear 94 is engaged with the teeth 82 on the rack or rod 80 to cause bi-directional sliding movement of the rod 80 relative to the top 30 depending upon the direction of rotation of the motor output shaft 90.

In this manner, the output shaft 90 of the motor 86 may be rotated in the one direction to cause an extension of the rod 80 into the interior chamber 20 to drive the compression plate 42 into the base of soap 22 to forcibly compress the small bars of soap 22. At the completion of the compression cycle as determined by full extension of the rod 80, the user simply moves the switch 88 to an opposite position which reverses the polarity of electric power applied to the motor 86 thereby causing rotation of the output shaft 90 in an opposite direction and a retraction of the rod 80 out of the top 30. Since the container 12 will typically be filled with water during a compression cycle, all of the electric power connections to the motor 86 are waterproof.

In summary, there has been disclosed a soap compressor for forming a plurality of small waste soap bars into one large soap bar. The soap compressor of the present invention makes use of an automatic means to drive a moveable compressor plate which, after activation, requires no further intervention by the user. Accordingly, the soap compressor of the present invention is extremely easy to use. The present soap compressor also makes novel use of pressurized water in existing building water lines to drive a fluid cylinder having an extensible piston rod connected to the compressor plate. Alternately, an electric motor may be employed to drive a gear and toothed rack attached to the compressor plate.

What is claimed is:

1. An apparatus for forming a single bar of soap from a plurality of small bars of soap, the apparatus comprising:

a container having side walls and a bottom forming an interior chamber;

a compression plate slidable into the interior chamber and the container;

an extension member connected to the compression plate; and means, coupled to the extension member, for automatically forcibly driving the extension member into the interior chamber to compress the plurality of small bars of soap into one large bar of soap in the bottom of the container, the driving means including:

a pressurized water operated cylinder having an internal piston movable between first and second positions depending upon a direction of pressurized water flow to the cylinder;

a piston rod coupled to the piston and having an end extending from the cylinder and connected to the compression plate, the piston rod forming the extension member; and means for attaching the cylinder to a source of pressurized water.

2. The apparatus of claim 1 further comprising:

a top releasibly mountable on an upper end of the side wall, the piston rod extensible mounted through the top.

3. The apparatus of claim 2 further comprising:

means for removably attaching the top to the side walls of the container.

4. The apparatus of claim 1 further comprising:

valve means, connected in fluid communication between the cylinder and the source of pressurized water, for selectively controlling water flow to the cylinder.

5. The apparatus of claim 1 further comprising:

a fluid conduit; and means for connecting the fluid conduit to the cylinder and the source of pressurized water.

6. The apparatus of claim 1 further comprising:

relief valve means, connected in fluid communication between the cylinder and the source of pressurized water, for selectively releasing water pressure from the cylinder.

7. The apparatus of claim 1 further comprising:

the container substantially filled with water; and at least one aperture formed in one of the top wall and the sidewalls of the container for allowing the discharge of water from the container as the compression plate is urged into the interior chamber in the container.

8. An apparatus for forming a single bar of soap from a plurality of small bars of soap, the apparatus comprising:

a small water filled container having side walls, a top wall mounted on the side walls, and a bottom forming an interior chamber;

a compression plate slidable into the interior chamber and the container;

an extension member connected to the compression plate;

means, coupled to the extension member, for automatically forcibly driving the extension member into the interior chamber to compress the plurality of small bars of soap into one large bar of soap in the bottom of the container, the driving means including:

a pressurized water operated cylinder having an internal piston movable between first and second positions depending upon a direction of pressurized water flow to the cylinder;

a piston rod coupled to the piston and having an end extending from the cylinder and connected to the compression plate, the piston rod forming the extension member;

means for attaching the cylinder to a source of pressurized water; and at least one aperture formed in one of the top wall and the side walls of the container for discharging water from the container as the compression plate is urged into the interior chamber in the container.

* * * * *